United States Patent Office 2,722,902
Patented Nov. 8, 1955

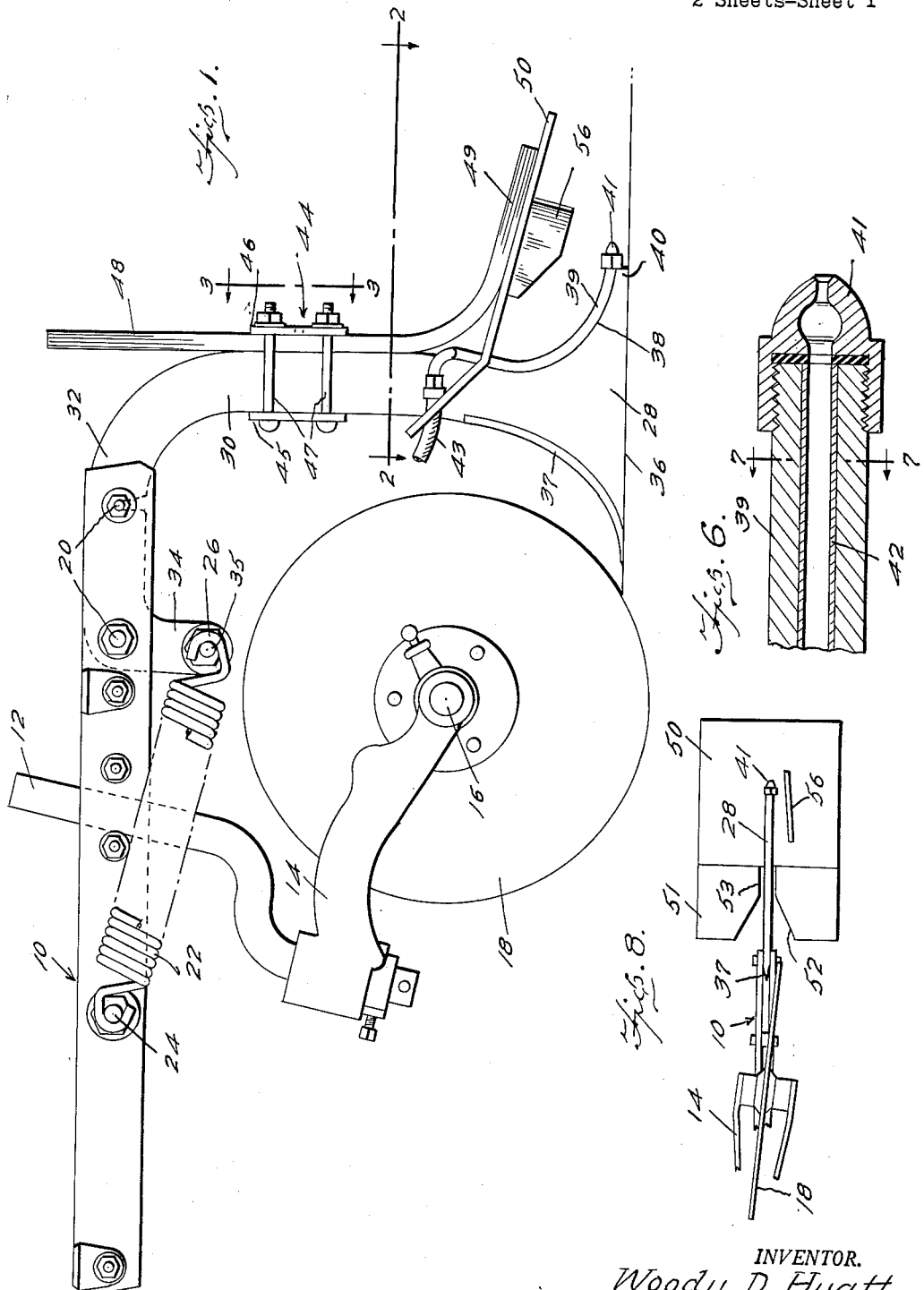

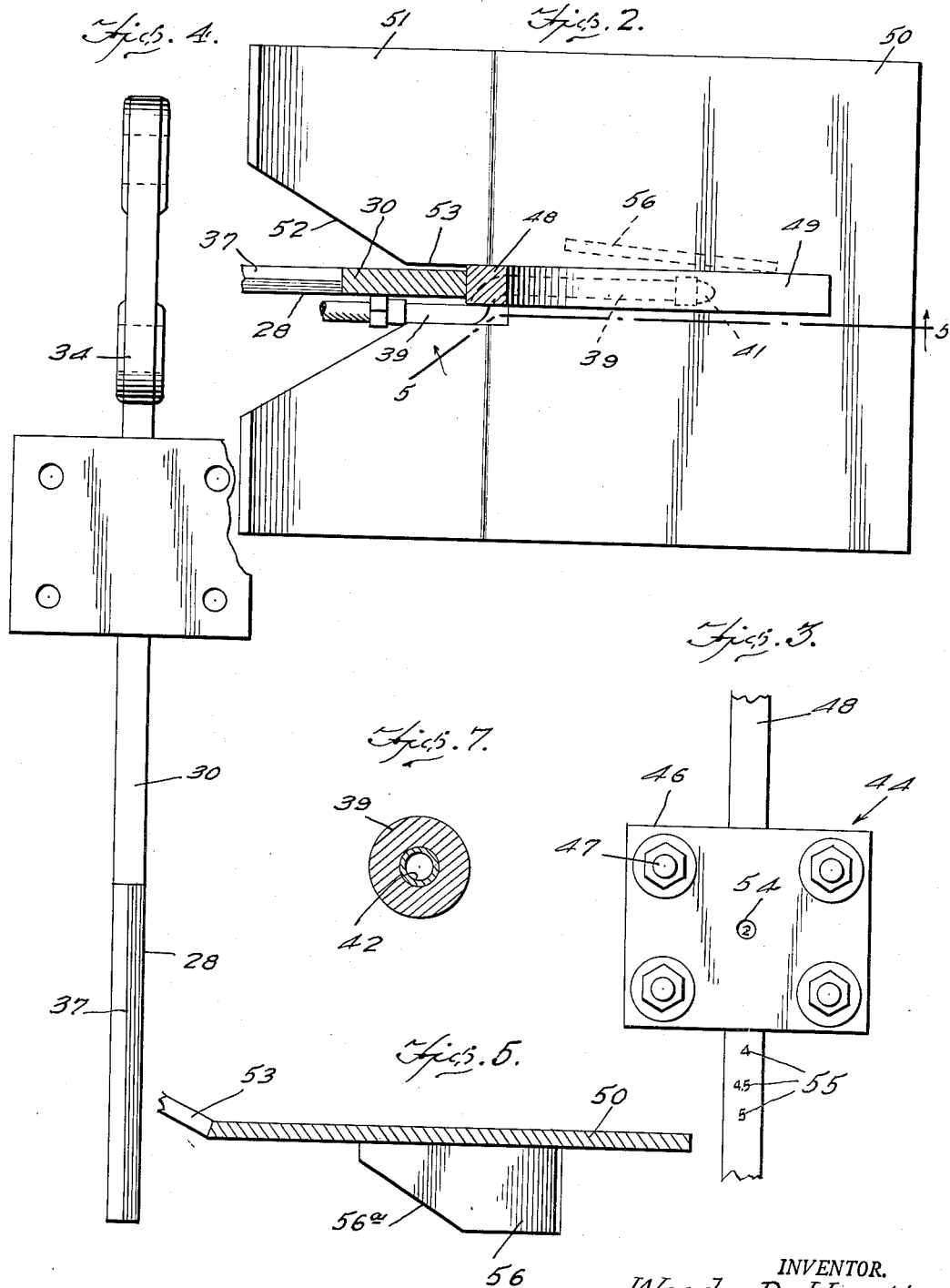

2,722,902

CHEMICAL INJECTOR PLOW

Woody D. Hyatt, Livingston, Ala.

Application September 17, 1951, Serial No. 246,925

1 Claim. (Cl. 111—7)

This invention relates generally to the class of agricultural machines and is directed particularly to improvements in apparatus for introducing fertilizer chemicals into the soil.

In the fertilizing of agricultural lands extensive use is made of anhydrous ammonia for introducing into the ground necessary nitrogen. At the present time apparatus is employed which introduces the ammonia gas beneath the surface of the earth by means of a ground penetrating knife or plow and after the gas is released the channel cut into the ground should be immediately closed so as to prevent the gas from escaping.

The apparatus of the type at present employed works satisfactorily in light sandy types of soil but is not sufficient in soil which is of a plastic or heavy type such as soils having a high content of clay, due to the fact that such soils will not fill the furrow after the plow has passed with the result that the ammonia escapes.

Another fault to be found with the ammonia applicator of the character at present commonly employed is that as the ammonia gas escapes from the end of the tube by which it is introduced into the ground, the expansion of the gas reduces the temperature around the tube outlet so that the earth at the tube outlet is frozen into a ball with the result that the furrow is made larger than necessary and more of the gas can escape into the air. This condition makes it necessary for the operator of the machine to frequently stop the machine and remove the frozen ball from the applicator.

The present invention has for its principal object to provide apparatus which is so designed that the above described undesirable conditions are avoided.

Another and more specific object of the invention is to provide an improved apparatus for introducing anhydrous ammonia into the ground, which is so designed that the machine will operate efficiently in heavy plastic or clay types of soil as well as in light sandy soil.

Still another object of the invention is to provide an apparatus of the character stated wherein means is provided for immediately covering the furrow formed in the ground after the introduction of the gas so that the escape of the gas from the ground is reduced to a minimum.

Still another object of the invention is to provide apparatus designed in a novel manner whereby the formation of a frozen ball of earth at the outlet of the gas discharge tube or nozzle is prevented so that the operator is not required to stop his machine from time to time to remove such earth ball.

Other objects and advantages of the invention will become apparent as the description of the same proceeds and the invention will be best understood from a consideration of the following detailed description taken in connection with the accompanying drawings forming part of the specification, with the understanding, however, that the invention is not to be limited to the exact details of construction shown and described since obvious modifications will occur to a person skilled in the art.

In the drawings:

Figure 1 illustrates in side elevation the application of the present invention to an ordinary colter disk cultivator frame wherein the plow forming a part of the invention is attached in the place of the spring shank cultivator tine to follow the colter disk.

Figure 2 is a horizontal section taken substantially on the line 2—2 of Figure 1.

Figure 3 is a sectional view taken substantially on the line 3—3 of Figure 1.

Figure 4 is a view in front elevation of the plow and shank.

Figure 5 is a central longitudinal section taken substantially on the line 5—5 of Figure 2 through the regulator plate with the regulator supporting bracket removed.

Figure 6 is a longitudinal sectional view on an enlarged scale through the rear end and nozzle of the gas discharging tube.

Figure 7 is a transverse section taken substantially on the line 7—7 of Figure 6.

Figure 8 is a bottom plan view on a reduced scale, of the element showing the working relation of the same.

Referring now more specifically to the drawings the numeral 10 generally designates a portion of a standard cultivator frame upon which the present apparatus is mounted and showing attached to the frame the coulter disk mounting shank 12, which carries at its lower end, beneath the frame, the disk supporting fork 14 which carries the axle 16 upon which the coulter disk 18 is rotatably mounted.

In the rear end portion of the frame are the mounting bolts 20 by which there is attached to the frame the regular spring shank cultivator tine (not shown) which is held in working position by a pair of springs 22, one only of which is shown, the springs being each attached at one end to the frame as at 24 and having a hook 26 at their other ends for connection with the pivotally mounted culvitator tine which, for the application of the present apparatus, is removed.

In accordance with the present invention there is provided a thin blade plow 28 which is carried at the lower end of a shank 30, the upper end of the shank being extended into the substantially horizontal arm 32 which terminates in the downturned lug 34.

At the free end of the arm 32 a suitable aperture (not shown) is provided for the extension through the arm of the mounting bolts 20 and the lower end of the lug, which hangs below the frame 10, carries a bolt 35 to which the hook 26 of the spring 22 is attached.

The plow 28 is, as previously stated, in the form of a thin blade, as clearly shown in Figure 4, and the blade gradually increases in width toward the bottom edge 36 so that there is provided the downwardly and forwardly curving advancing edge 37 which is sharpened to cut through the earth, and the downwardly and rearwardly curving back edge 38 which, while curved longitudinally is transversely flat.

Disposed upon this downwardly and rearwardly curving back edge 38 of the plow is the metal tube 39 which is spot welded or otherwise suitably secured to the plow and which at its lower end extends beyond the heel 40 of the plow, as shown in Figure 1. This extended rear end has threaded thereon the discharge nozzle 41. The inner surface of the tube 39 is covered by an insulation coating 42 to protect the tube against attack by the chemical gas.

At its upper end the tube 39 extends forwardly across a side of the shank 30 and is attached to a suitable hose 43 which is connected with the source of supply for the ammonia gas or other chemical.

Above the plow blade 28, the shank 30 has fixed thereto a clamp which is generally designated 44 and, while it may be of any suitable character, it is here shown as comprising a front plate 45 and a back plate 46 which are disposed with the front plate across the forward edge of the shank and in contact therewith, while the back plate 46 extends across and is spaced from the back edge of the shank. In addition the clamp includes the four bolts 47 which connect the plates together.

The clamp unit 44 secures against the back of the shank 30 a vertical bar 48, the lower end of which extends therefrom at an obtuse angle providing a foot 49 which is secured to the top surface of a depth regulator plate 50. As shown in Figure 2, the plate 50 in the form of an approximately square sheet of material, preferably metal, of suitable weight, having a forward upturned or upwardly angled prow which is provided with a forwardly opening V notch 52 which leads into a short straight slot 53 which lies on the longitudinal center of the plate 50. The slot 53 receives the lower end of the plow shank 30 and the gas tube 39 as shown in Figure 2, and the downwardly and rearwardly extending foot 49 of the bar 48 supports the regulator plate at a downward and rearward inclination at a prescribed height above the gas discharge nozzle 41.

As is clearly shown the suspension bar 48 passes between the rear edge of the plow shank 30 and the back plate 46 of the clamp unit and the clamp unit secures the bar against the back of the shank.

In order to have a gage for determining desired positions of setting of the regulator plate 50 with respect to the line of the bottom edge 36 of the plow, the rear clamp plate 46 is provided with a sight opening 54 and the back face of the suspension bar 48 is provided with a suitable scale of numerals as indicated at 55 which are positioned so that one of the numerals can be viewed through the opening 54 when the bar 48 is moved up or down with respect to the plate 46. For example, if the numeral 2 shows through the opening 54, as in Figure 3, this may indicate that the lowermost part of the regulator plate, which would be the back edge 50, is approximately two inches above the bottom 36 of the plow.

Secured to the under face of the regulator plate 50 and extending longitudinally thereof adjacent to and at one side of the longitudinal center of the plate 50 and at a slight oblique angle to the plate center, is a covering blade 56. As shown in Figure 2 the back or rear edge of this blade is nearest to the longitudinal center of the regulator plate 50 and is approximately in the vertical plane of the side face of the plow nearest to the blade 56.

The bottom edge of the cover blade or sealer 56 has the forward portion thereof cut at an angle or sloped as shown at 56a so that the sealer or cover blade may more easily pass through the ground.

In the operation of the present invention the coulter disk and the plow are set so that the disk will cut slightly deeper into the sod than the point of the plow which immediately follows it. The plow follows in the cut made by the disk and as it is very thin it cuts a very narrow slit in the sod.

The discharge tube 39 follows the plow, the nozzle discharging at the heel 40 of the plow close to the bottom edge thereof. By this arrangement the freezing of an earth ball on the nozzle is prevented.

The plate 50 regulates the depth to which the plow extends into the earth and also aids in covering the furrow. In addition the sealer blade 56 which is welded to the underside of the regulator plate, penetrates the earth and tends to force the earth laterally to effect the sealing of the furrow made by the disk and plow.

With this apparatus after the disk and plow have passed along and applied the ammonia gas, the ground and sod are left as smooth as before being cut into by the disk and plow so that the gas which has been discharged into the furrow is prevented from escaping and the ground receives the full benefit of the fertilizer.

The present device does not tear up the sod when used on sod land and therefore is not detrimental to such land and it has the advantage of putting the fertilizing material in the ground rather than on the surface as is the present practice in fertilizing sod land. When the latter practice is employed a good deal of the fertilizer is frequently wasted due to the fact that heavy rains which may follow the application of the dry fertilizer to the surface of the ground will wash away a good deal of the fertilizer, whereas this cannot happen in the use of the present apparatus.

I claim:

An injector plow for introducing chemicals into the soil, said plow comprising a thin furrow forming blade disposed in a generally vertical longitudinal plane and having a heel at the lower rear end thereof, a length of tubing connected with a source of chemical and supported on and along the trailing edge of said blade with the lower end of the tubing terminating just beyond the rear of said heel, a nozzle on the lower end of said tubing directed rearwardly in the plane of said blade, an elongated rectangular ground-smoothing plate supported on said blade at furrow depth above said nozzle and the lower portion of said blade, said plate having a front end portion angled upwardly and forwardly, said front end portion being provided with a notch opening through its leading edge, said blade and tubing being received in said notch, and a generally vertical furrow-closing plate mounted edgewise on the underside of the first mentioned plate, said furrow-closing plate being disposed above and to one side of said nozzle in a plane which diverges slightly from the plane of said blade in a forward direction, said last mentioned plate extending forwardly from a point rearwardly of said nozzle to a point adjacent, but to the rear of said notch.

References Cited in the file of this patent

UNITED STATES PATENTS

| 169,721 | Mole | Nov. 9, 1875 |
| 221,004 | Strayer | Oct. 28, 1879 |
| 642,676 | Carpenter | Feb. 6, 1900 |
| 889,947 | Miller | June 9, 1908 |
| 1,002,344 | Watson | Sept. 5, 1911 |
| 1,425,451 | Conti | Aug. 8, 1922 |
| 2,439,743 | McEwen | Apr. 13, 1948 |
| 2,534,798 | Schneider | Dec. 19, 1950 |

FOREIGN PATENTS

| 144,504 | France | Aug. 12, 1881 |
| 161,192 | France | Mar. 26, 1884 |
| 738,515 | France | Oct. 17, 1932 |
| 843,895 | France | Apr. 3, 1939 |
| 150,140 | Great Britain | Sept. 2, 1920 |

OTHER REFERENCES

Agricultural Engineering, Sept. 1947, pages 394, 395, 396.